(12) United States Patent
Baxter et al.

(10) Patent No.: US 10,737,225 B2
(45) Date of Patent: Aug. 11, 2020

(54) NESTED BUBBLING APPARATUS

(71) Applicants: Larry Baxter, Orem, UT (US); Jacom Chamberlain, Provo, UT (US); Kyler Stitt, Lindon, UT (US); David Frankman, Provo, UT (US); Christopher Bence, Tigard, OR (US); Aaron Sayre, Spanish Fork, UT (US)

(72) Inventors: Larry Baxter, Orem, UT (US); Jacom Chamberlain, Provo, UT (US); Kyler Stitt, Lindon, UT (US); David Frankman, Provo, UT (US); Christopher Bence, Tigard, OR (US); Aaron Sayre, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/727,817

(22) Filed: Oct. 9, 2017

(65) Prior Publication Data

US 2019/0105616 A1  Apr. 11, 2019

(51) Int. Cl.
| | |
|---|---|
| *B01F 3/00* | (2006.01) |
| *B01F 3/04* | (2006.01) |
| *B01D 3/18* | (2006.01) |
| *B01D 5/00* | (2006.01) |

(52) U.S. Cl.
CPC ............ *B01F 3/04262* (2013.01); *B01D 3/18* (2013.01); *B01D 5/003* (2013.01); *B01F 3/04248* (2013.01); *B01F 2003/04297* (2013.01); *B01F 2003/04312* (2013.01); *B01F 2003/04319* (2013.01)

(58) Field of Classification Search
CPC .... B01F 3/04262; B01F 3/18; B01F 3/04248; B01F 2003/04297; B01F 2003/04312; B01F 2003/04319; B01D 3/18; B01D 5/003
See application file for complete search history.

(56) References Cited

U.S. PATENT DOCUMENTS 5,453,107 A * 9/1995 Liu ...................... B01D 50/006
                                                    95/226
2005/0006315 A1* 1/2005 Naess .................. A01K 63/042
                                                    210/758

* cited by examiner

*Primary Examiner* — Anshu Bhatia

(57) ABSTRACT

A device for bubbling a gas into a liquid is disclosed. The device comprises a first bubbling apparatus nested inside a second bubbling apparatus. The first bubbling apparatus comprises a gas inlet for receiving the gas and a plurality of first openings for releasing the gas. The second bubbling apparatus at least partially encloses the plurality of first openings of the first bubbling apparatus. The second bubbling apparatus receives the gas from the plurality of first openings. The second bubbling apparatus comprises a plurality of second openings for bubbling the gas into the liquid.

12 Claims, 11 Drawing Sheets

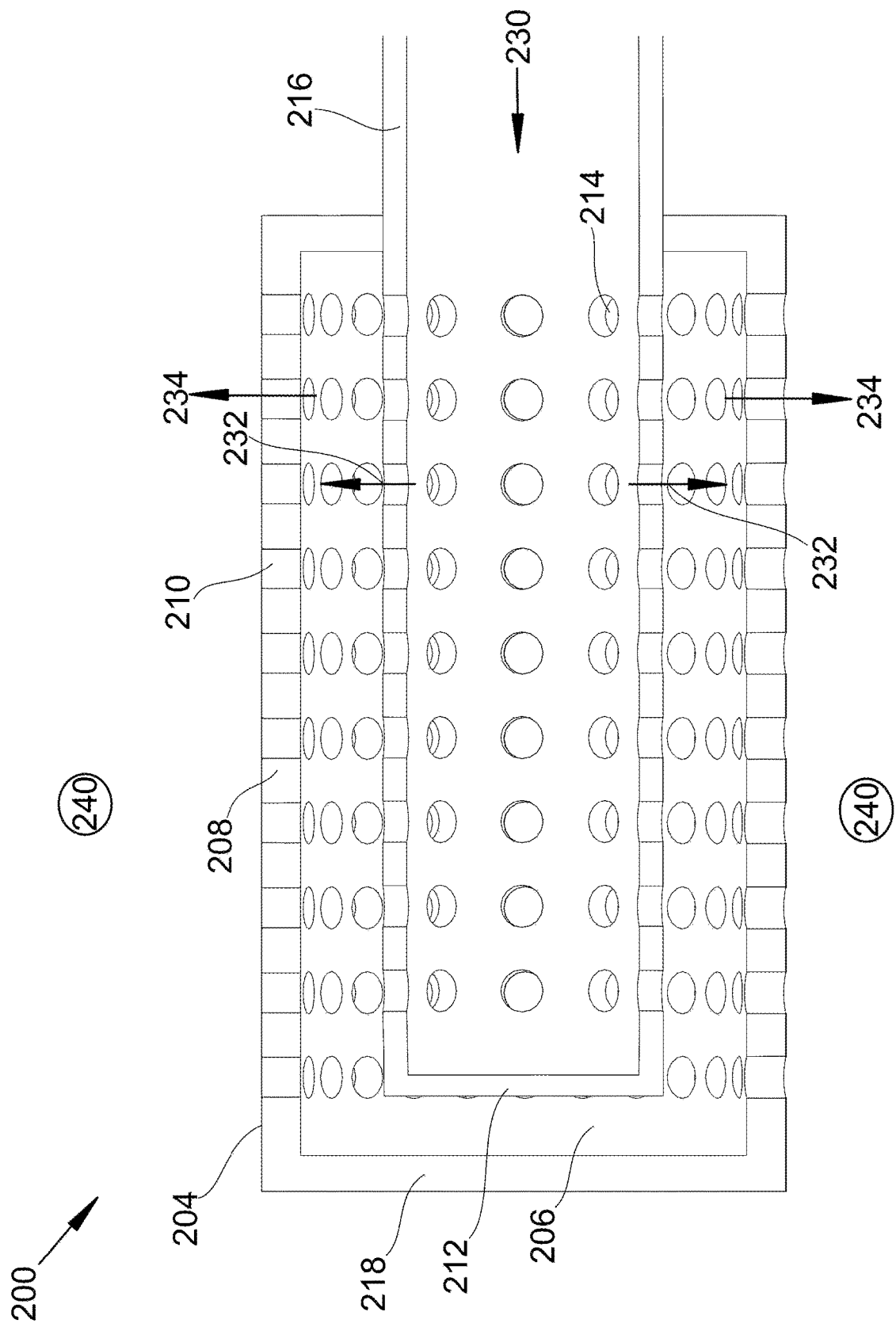

NESTED BUBBLING APPARATUS

GOVERNMENT INTEREST STATEMENT

This invention was made with government support under DE-FE0028697 awarded by the Department of Energy. The government has certain rights in the invention.

FIELD OF THE INVENTION

The devices, systems, and methods described herein relate generally to cooling gas distribution into liquids. More particularly, the devices, systems, and methods described herein relate to even gas distribution across bubbling apparatuses.

BACKGROUND

Many different processes require gases to contact liquids for both heat and material exchange. Even distribution of these gases through bubbling apparatuses such as bubble trays, bubble plates, spargers, and other devices is difficult. This can be exacerbated greatly when solids form from reaction or freezing due to contact between the gas and the liquid. The solids can block the openings in the bubbling apparatuses, resulting in uneven distributions and reduced exchange efficiencies. A device for preventing this is needed.

SUMMARY

A device for bubbling a gas into a liquid is disclosed. The device comprises a first bubbling apparatus nested inside a second bubbling apparatus. The first bubbling apparatus comprises a gas inlet for receiving the gas and a plurality of first openings for releasing the gas. The second bubbling apparatus at least partially encloses the plurality of first openings of the first bubbling apparatus. The second bubbling apparatus receives the gas from the plurality of first openings. The second bubbling apparatus comprises a plurality of second openings for bubbling the gas into the liquid.

The plurality of first openings may be situated such that the gas is evenly distributed to the plurality of second openings. The plurality of first openings may be situated such that the gas produces substantially similar sizes of bubbles from the second openings. The second bubbling apparatus may comprise a bubble plate or bubble tray. The plurality of first openings may be situated at a 90-180 degree offset from a surface that includes the plurality of second openings. In some instances, a line perpendicular to an outer surface of the first bubbling apparatus passing through any one of the plurality of first openings does not intersect any of the plurality of second openings.

The first bubbling apparatus may comprise a sparger, a nozzle, a bubble plate, a bubble cap, or a bubble tray. The second bubbling apparatus may be installed in a direct-contact exchanger. The direct-contact exchanger may comprise a bubble column, a bubble contactor, or a distillation column.

The he gas may comprise combustion flue gas, syngas, producer gas, natural gas, steam reforming gas, light gases, refinery off-gases, acid gases, hydrogen cyanide, water, hydrocarbons, or combinations thereof. The acid gases may comprise carbon dioxide, nitrogen oxide, sulfur dioxide, nitrogen dioxide, sulfur trioxide, hydrogen sulfide, or a combination thereof. The contact liquid may comprise water, hydrocarbons, liquid ammonia, liquid carbon dioxide, cryogenic liquids, or combinations thereof.

The first bubbling apparatus and the second bubbling apparatus may comprise metals, ceramics, polymers, resins, or combinations thereof.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 2 shows a cutaway side view of nested bubblers.

DETAILED DESCRIPTION

Figure 1A:
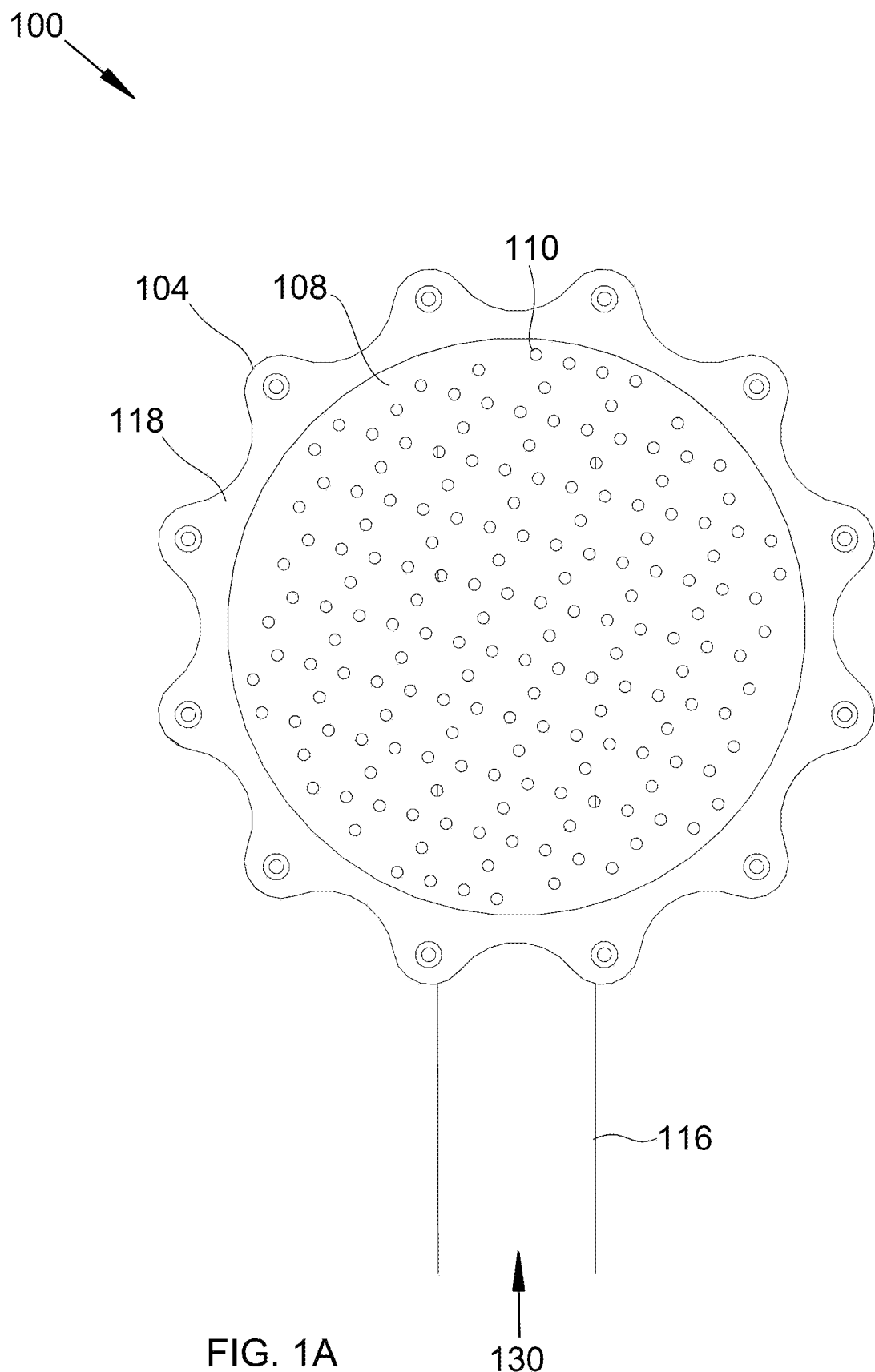
FIG. 1A shows a top view of a first bubbler nested in a second bubbler.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Combustion flue gas consists of the exhaust gas from a fireplace, oven, furnace, boiler, steam generator, or other combustor. The combustion fuel sources include coal, hydrocarbons, and bio-mass. Combustion flue gas varies greatly in composition depending on the method of combustion and the source of fuel. Combustion in pure oxygen produces little to no nitrogen in the flue gas. Combustion using air leads to the majority of the flue gas consisting of nitrogen. The non-nitrogen flue gas consists of mostly carbon dioxide, water, and sometimes unconsumed oxygen. Small amounts of carbon monoxide, nitrogen oxides, sulfur dioxide, hydrogen sulfide, and trace amounts of hundreds of other chemicals are present, depending on the source. Entrained dust and soot will also be present in all combustion flue gas streams. The method disclosed applies to any combustion flue gases. Dried combustion flue gas has had the water removed.

Syngas consists of hydrogen, carbon monoxide, and carbon dioxide.

Producer gas consists of a fuel gas manufactured from materials such as coal, wood, or syngas. It consists mostly of carbon monoxide, with tars and carbon dioxide present as well.

Steam reforming is the process of producing hydrogen, carbon monoxide, and other compounds from hydrocarbon fuels, including natural gas. The steam reforming gas referred to herein consists primarily of carbon monoxide and hydrogen, with varying amounts of carbon dioxide and water.

Light gases include gases with higher volatility than water, including hydrogen, helium, carbon dioxide, nitrogen, and oxygen. This list is for example only and should not be implied to constitute a limitation as to the viability of other gases in the process. A person of skill in the art would be able to evaluate any gas as to whether it has higher volatility than water.

Refinery off-gases comprise gases produced by refining precious metals, such as gold and silver. These off-gases tend to contain significant amounts of mercury and other metals.

Bubbling of these gases into cryogenic liquid can lead to several difficulties, not least of which is buildup of solids on holes through tje bubbling apparatuses. Uneven distribution of gases through these bubbling apparatuses can result in gas leaving the bubbling apparatus at varying velocities, with the lower velocity holes building up solids faster than higher velocity holes. As they build up, the buildup compounds until these holes become completely blocked. The devices, systems, and methods herein solve this issue by evenly distributing the gases through the bubbling apparatuses into the liquids.

Figure 1B:
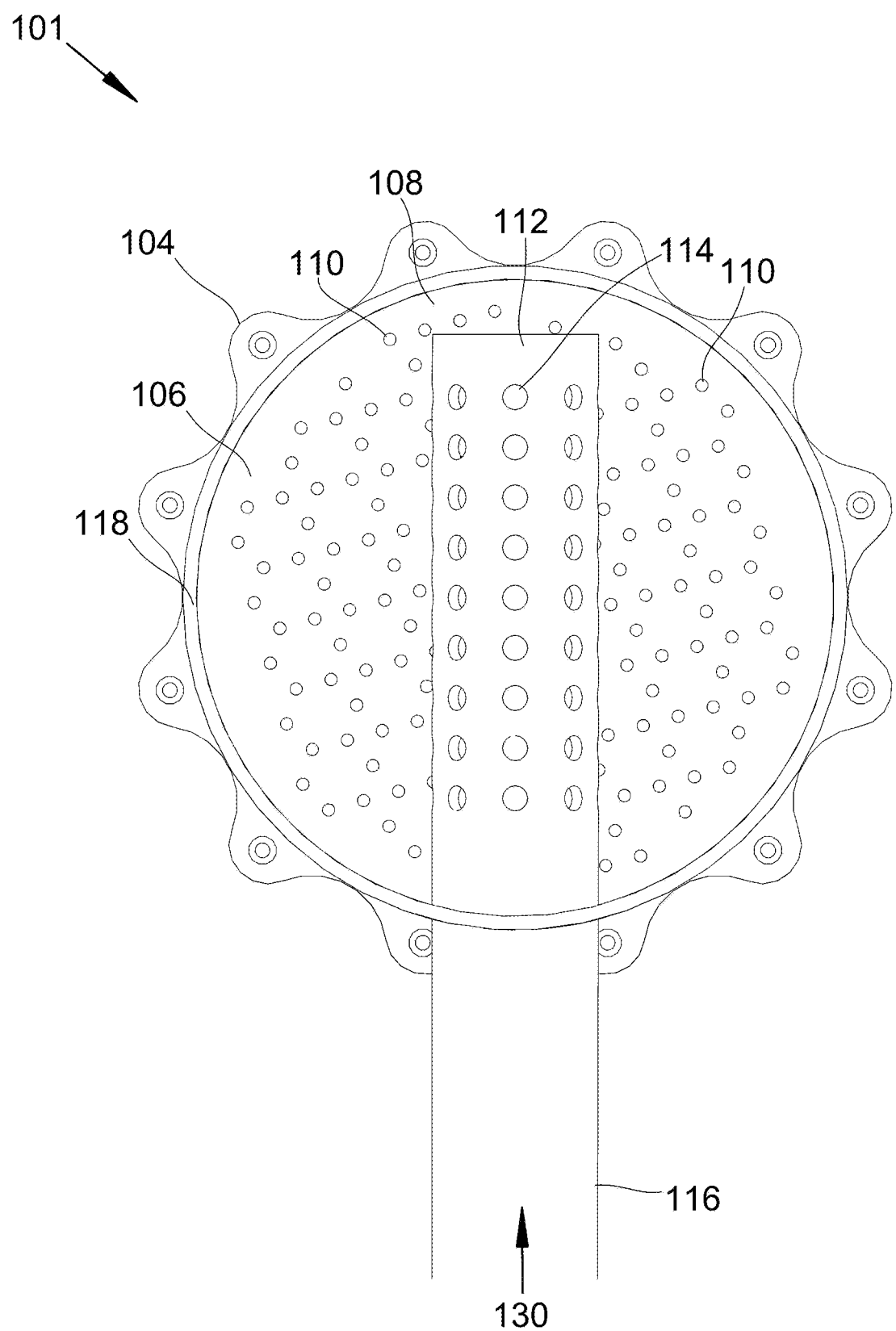
FIG. 1B shows a cutaway bottom view of the nested bubblers of FIG. 1A.
Figure 1C:
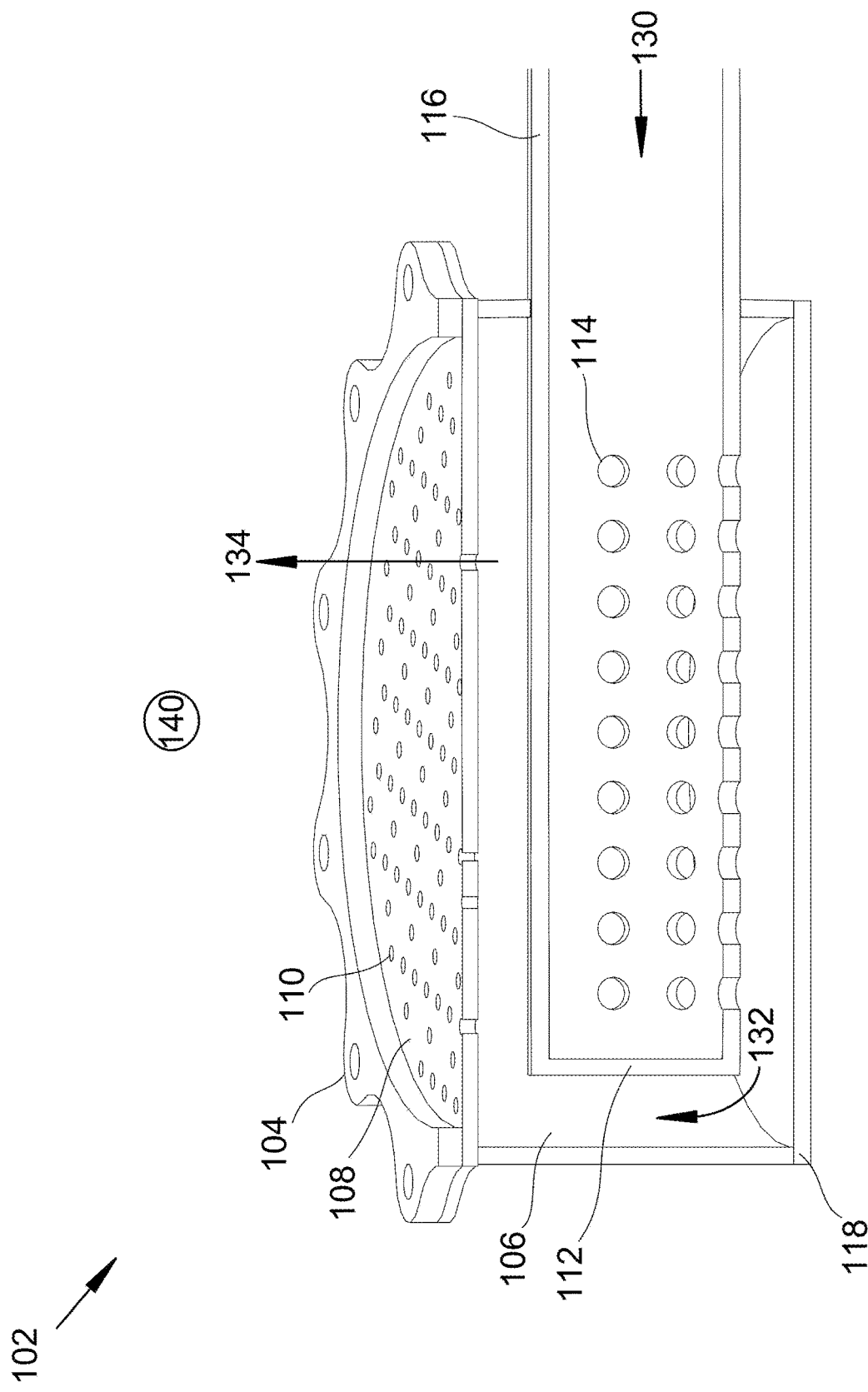
FIG. 1C shows a cutaway isometric top-front view of the nested bubblers of FIG. 1A.
Figure 1D:
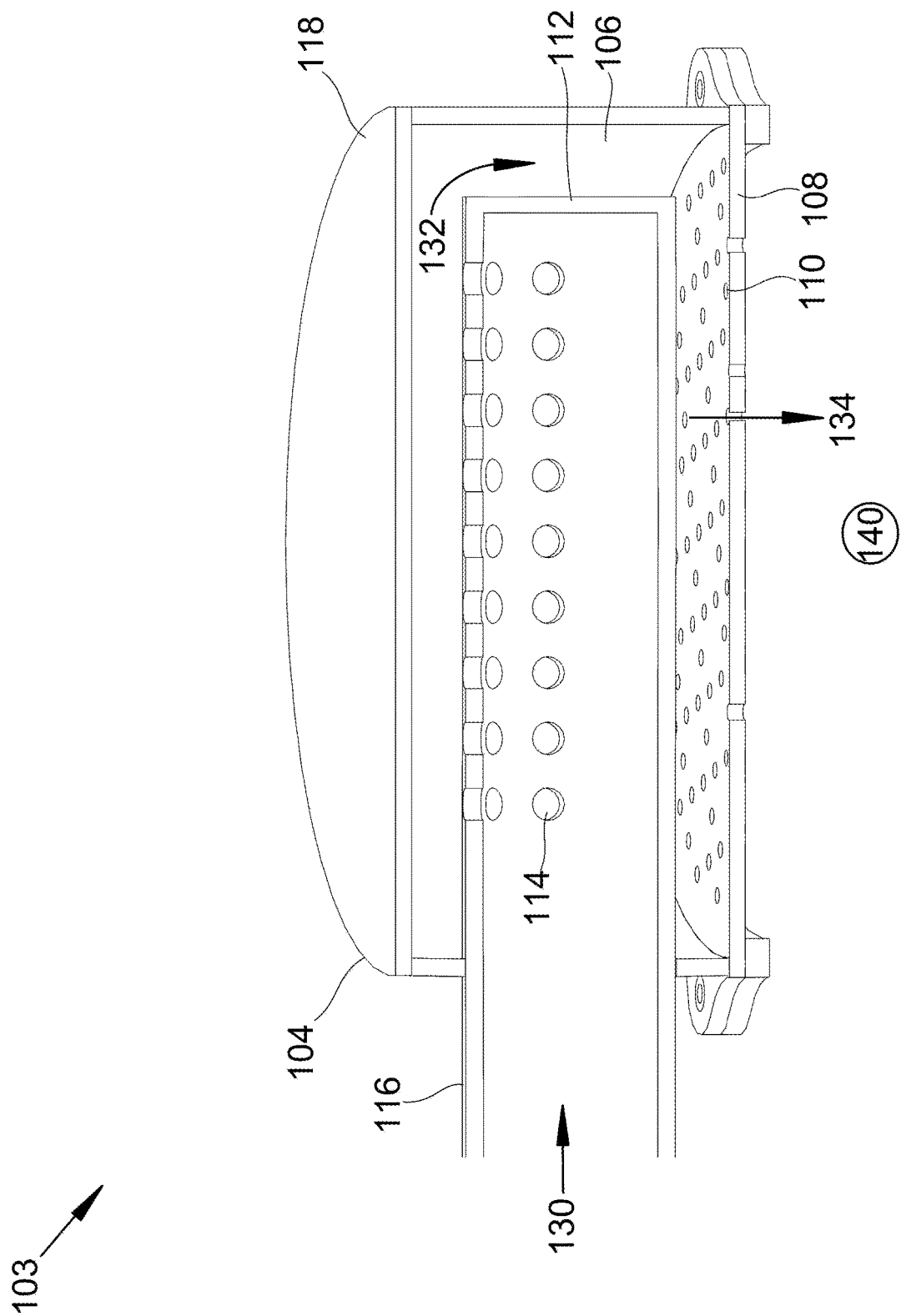
FIG. 1D shows a cutaway isometric bottom-back view of the nested bubblers of FIG. 1A.

Referring now to the Figures, FIG. 1A is a top view 100 of a first bubbler 112 nested in a second bubbler 106 that may be used in the described devices, systems, and methods. FIG. 1B shows a cutaway bottom view of the nested bubblers of FIG. 1A at 101. FIG. 1C shows a cutaway isometric top-front view of the nested bubblers of FIG. 1A at 102. FIG. 1D shows a cutaway isometric bottom-back view of the nested bubblers of FIG. 1A at 103. Nested bubblers 104 comprises first bubbler 112 nested in second bubbler 106. First bubbler 112 comprises gas inlet 116 and holes 114. Holes 114 are all enclosed inside of second bubbler 106. Second bubbler 106 comprises enclosure 118 and bubble plate 108 with holes 110. First bubbler 112 receives gas 130 through gas inlet 116. Gas 130 passes through holes 114 into second bubbler 106 as gas 132. Gas 132 then distributes out holes 108 as gas 134 into liquid 140. Holes 114 all face away from bubble plate 108 such that all of gas 132 is required to pass around the exterior of first bubbler 112 to reach holes 110. This breaks up any jet streams that result from passage through holes 114, resulting in better flow distributions through holes 110. In one instance, gas 130 comprises combustion flue gas and liquid 140 comprises a cryogenic fluid below the freezing point of carbon dioxide, such as pentane. Without first bubbler 112, carbon dioxide desublimates onto the edges of holes 114 near the outside of bubble plate 108, even with high gas velocities. Uneven distribution means that gas velocities high enough for the outer holes 114 to not become block result in jetting of gases through holes 114 nearer the center of plate 108. However, with first bubbler 112 inside of second bubbler 106, the flue gas passes through the holes evenly, and so gas velocities can be kept high enough to prevent desublimation of carbon dioxide onto any of holes 114, without jetting of gases through holes 114.

Referring to FIG. 2, FIG. 2 is a cutaway side view 200 of nested bubblers 204 that may be used in the described devices, systems, and methods. Nested bubblers 204 are similar to nested bubblers 104 in that each is immersed in a liquid. However, nested bubblers 204 are symmetric radially. Nested bubblers 204 comprises first bubbler 212 nested inside of second bubbler 106. First bubbler 212 comprises gas inlet 216 and holes 214. Holes 214 are all enclosed inside of second bubbler 206. Second bubbler 206 comprises enclosure 218 and bubble plate 208 with holes 210. First bubbler 212 receives gas 230 through gas inlet 216. Gas 230 passes through holes 214 into second bubbler 206 as gas 232. Gas 232 then distributes out holes 208 as gas 234 into liquid 240. Holes 214 are symmetrically arranged radially. Gas 230 passes through holes 214, into the larger volume of second bubbler 206. The turbulence from this passage prevents laminar flow into holes 210, allowing for better gas distribution.

Figure 3A:
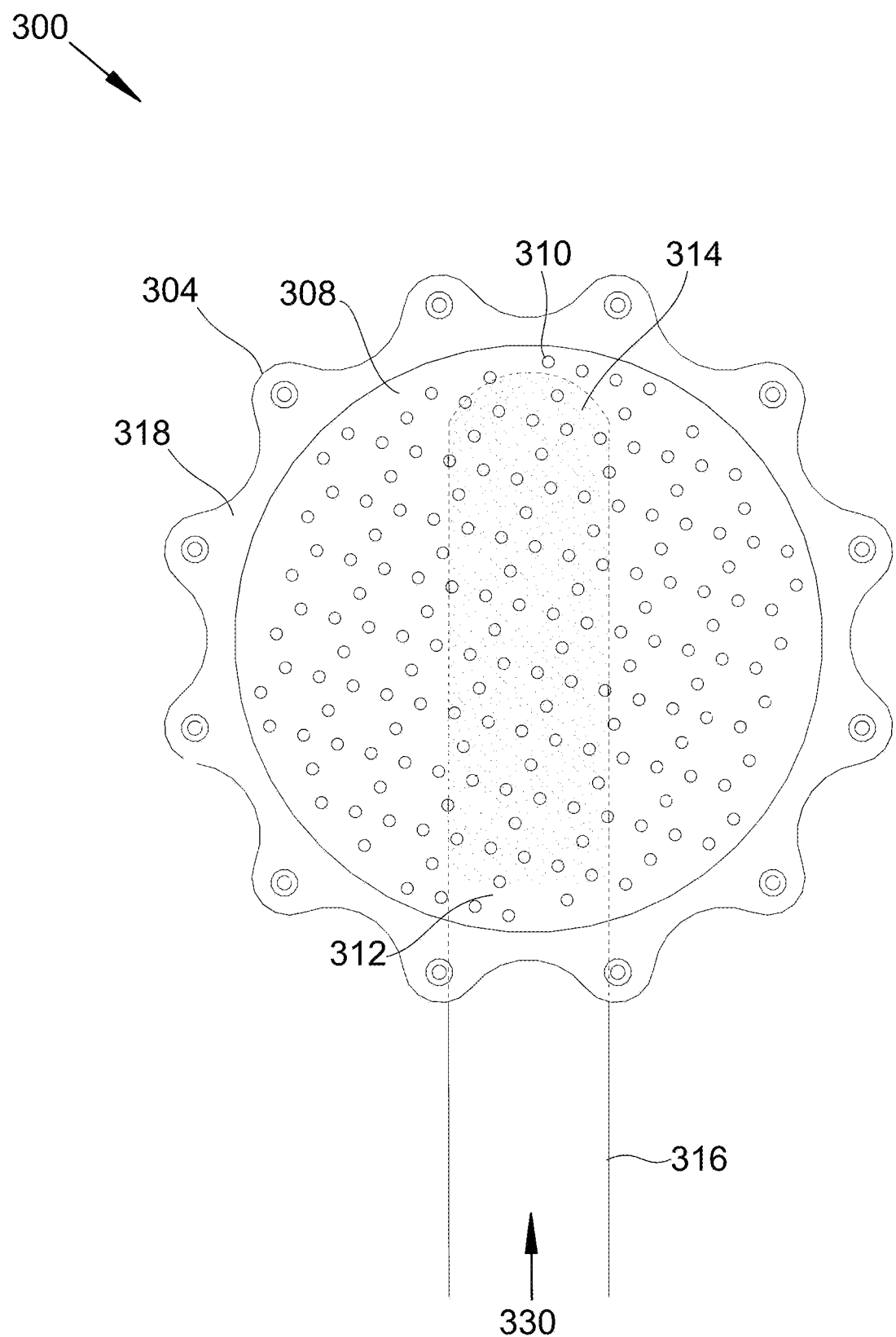
FIG. 3A shows a top view of a sparger nested in a bubbler.
Figure 3B:
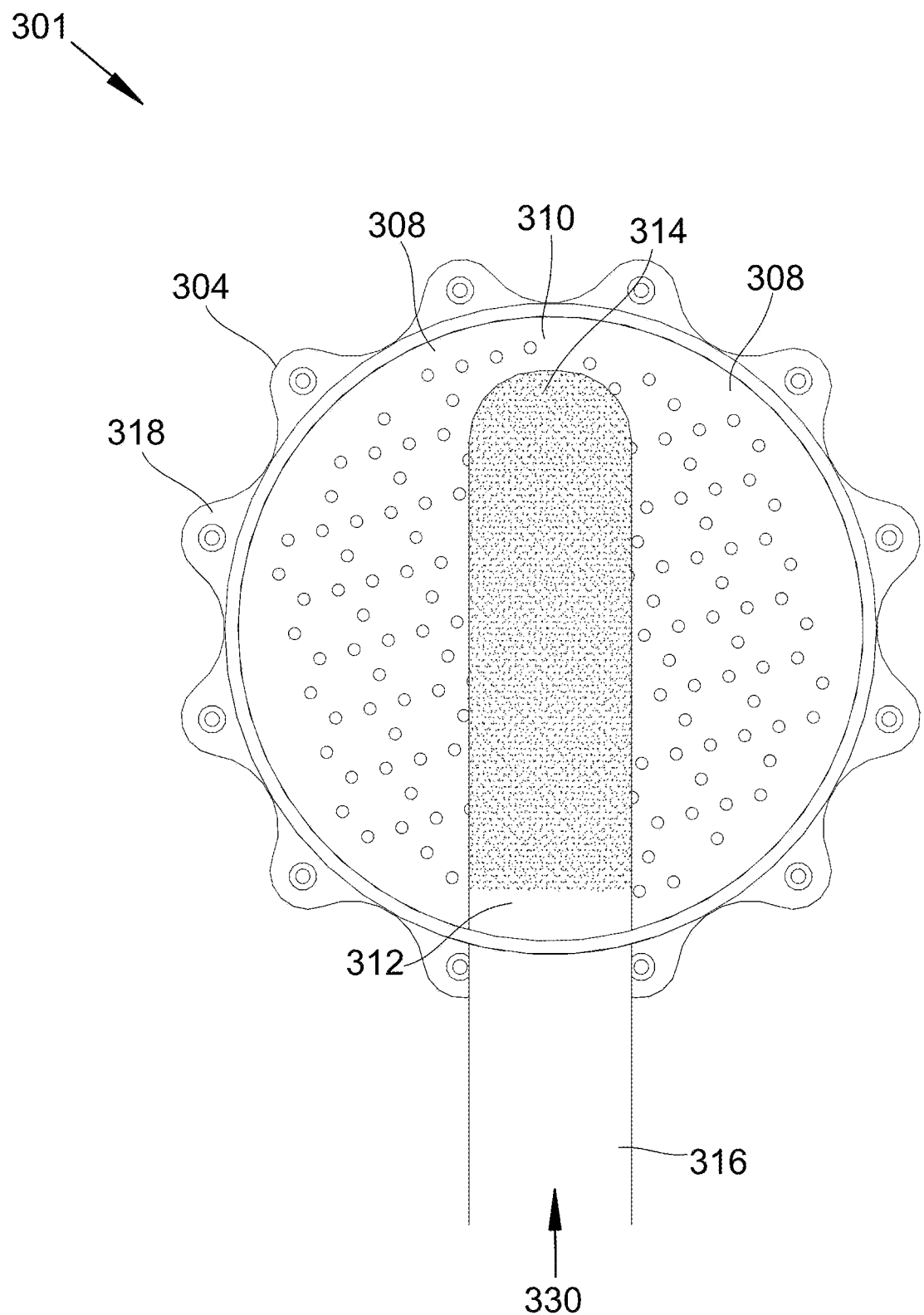
FIG. 3B shows a cutaway bottom view of the nested sparger and bubbler of FIG. 3A.
Figure 3C:
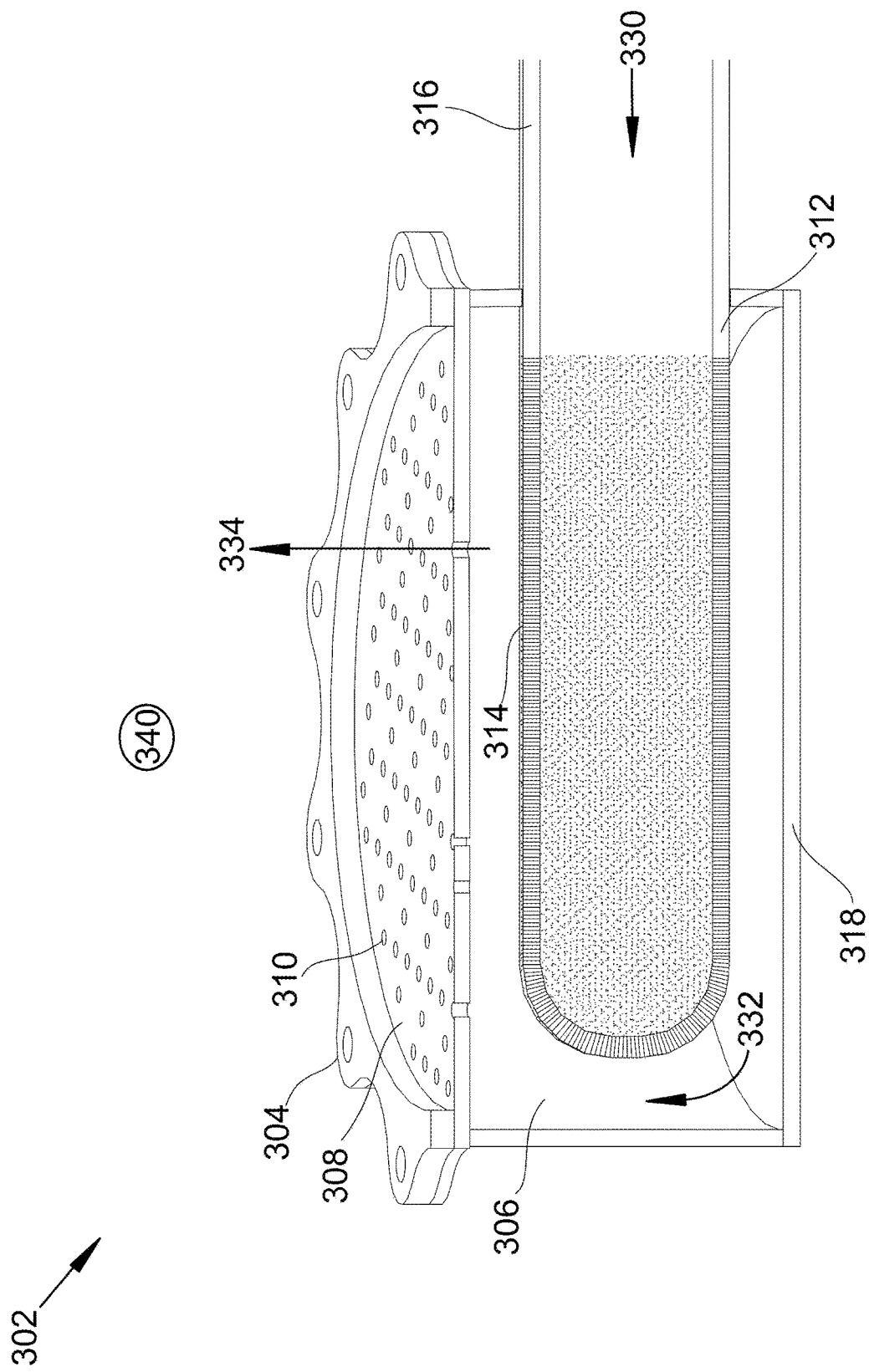
FIG. 3C shows a cutaway isometric top-front view of the nested sparger and bubbler of FIG. 3A.
Figure 3D:
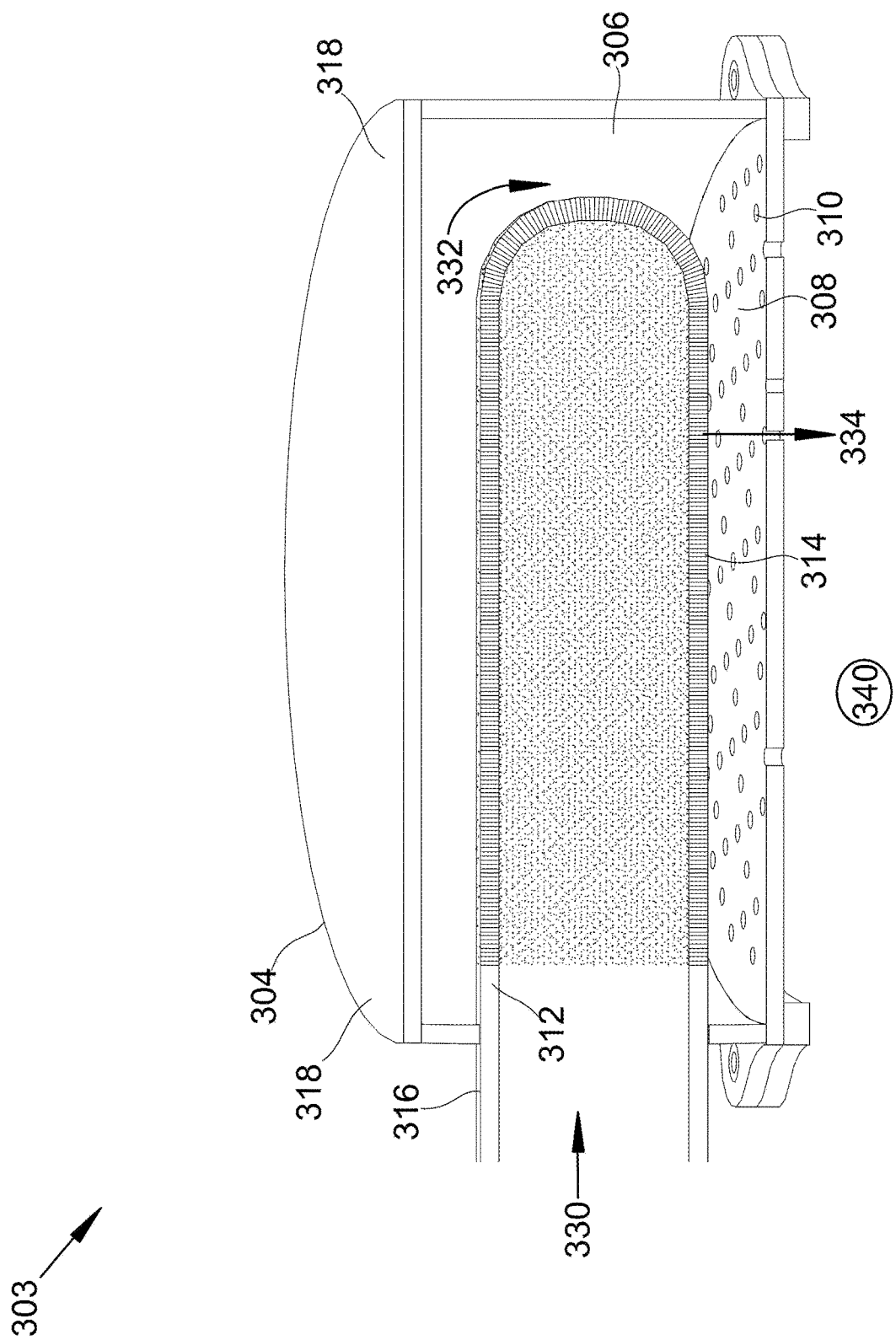
FIG. 3D shows a cutaway isometric bottom-back view of the nested sparger and bubbler of FIG. 3A.

Referring to FIG. 3A, FIG. 3 is a top view 300 of a sparger 312 (in some embodiments, the sparger 312 may be one example of the first bubbler 112, 212 as illustrated in FIGS. 1 and 2) nested in a bubbler 304 that may be used in the described devices, systems, and methods. FIG. 3B shows a cutaway bottom view of the nested sparger and bubbler of FIG. 3A at 301. FIG. 3C shows a cutaway isometric top-front view of the nested sparger and bubbler of FIG. 3A at 302. FIG. 3D shows a cutaway isometric bottom-back view of the nested sparger and bubbler of FIG. 3A at 303. Nested sparger and bubbler 304 comprises sparger 312 nested in bubbler 306. Sparger 312 comprises gas inlet 316 and porous surface 314. Porous surface 314 is enclosed inside of bubbler 306. Bubbler 306 comprises enclosure 318 and bubble plate 308 with holes 310. Sparger 312 receives gas 330 through gas inlet 316. Gas 330 passes through porous surface 314 into bubbler 306 as gas 332. Gas 332 then distributes out holes 308 as gas 334 into liquid 340. As gas 330 passes through porous surface 314 into the larger volume of second bubbler 306, the turbulence prevents laminar flow into holes 310, allowing for better gas distribution.

Figure 4:
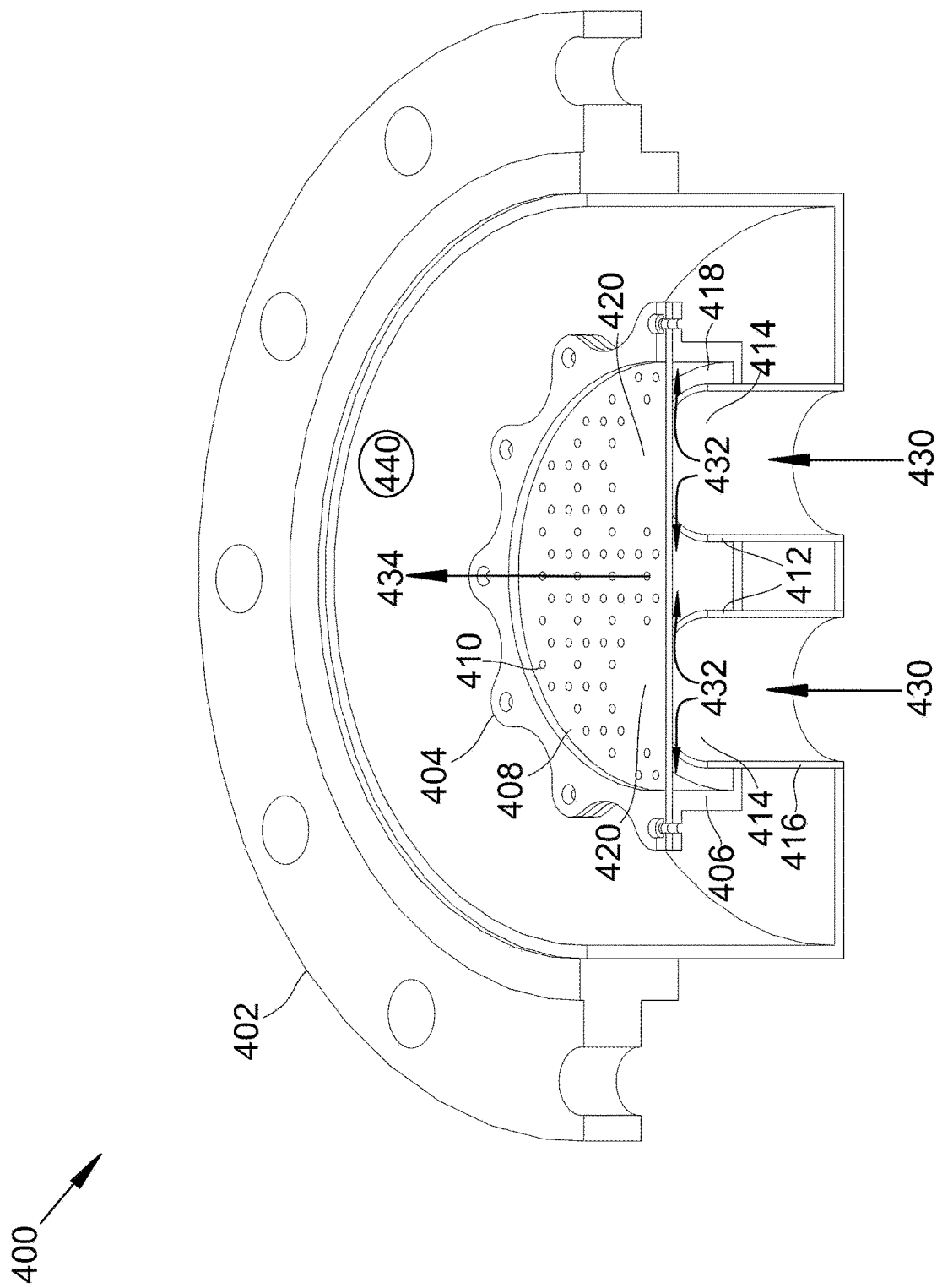
FIG. 4 shows a cutaway top front isometric view of a bottom portion of a vessel with nested bubblers.

Referring to FIG. 4, FIG. 4 is a cutaway top front isometric view 400 of a bottom portion of a vessel 402 with nested bubblers 404 that may be used in the described devices, systems, and methods. Bubble column 402 (top portion not shown for clarity) comprises a liquid inlet and gas outlet in the top portion, nested bubblers 404, and a liquid outlet obscured behind and below nested bubblers 404. Nested bubblers 404 comprises first bubbler 412 nested in second bubbler 406. First bubbler 412 comprises gas inlet 416 and holes 414. Holes 414 are enclosed inside of second bubbler 406. Second bubbler 406 comprises enclosure 418 and bubble plate 408 with holes 410. First bubbler 412 receives gas 430 through gas inlet 416. Gas 430 passes through holes 414 into second bubbler 406 as gas 432. Gas 432 then distributes out holes 408 as gas 434 into liquid 440. Holes 414 face blank patches 420 on bubble plate 408. Blank patches 420 have no holes 410. As such, when gas 432 strikes blank patches 420, it is forced to distribute sideways along bubble plate 408, resulting in a turbulent flow and better flow patterns through holes 410.

Figure 5:
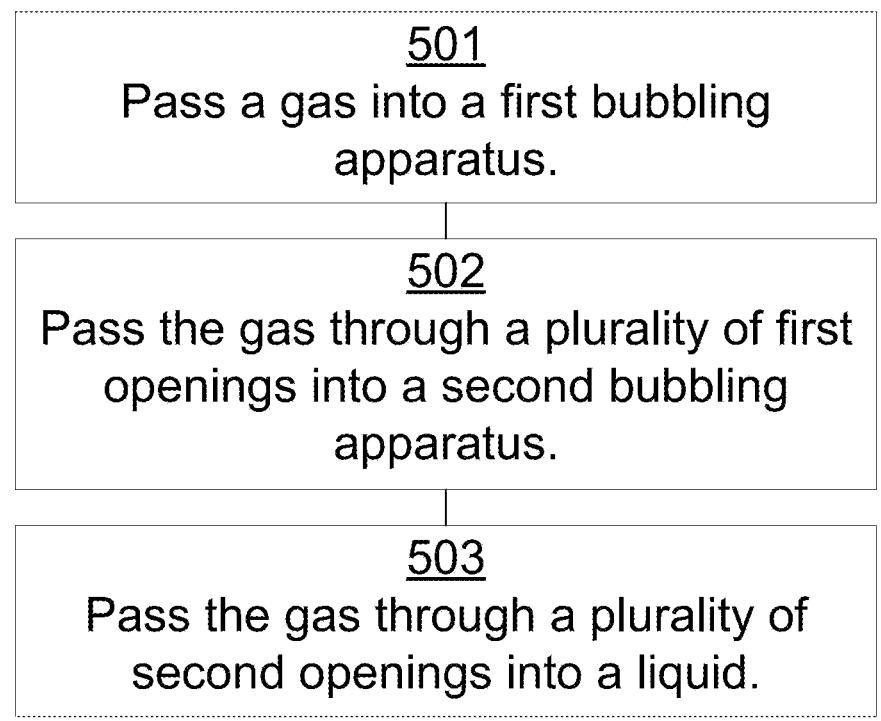
FIG. 5 shows a method for bubbling a gas into a liquid.

Referring to FIG. 5, FIG. 5 is a method 500 for bubbling a gas into a liquid. A gas is passed into a first bubbling apparatus 501. The first bubbling apparatus comprises a gas inlet for receiving the gas and a plurality of first openings for releasing the gas. The gas is passed through the plurality of first openings into a second bubbling apparatus 502. The second bubbling apparatus comprises a plurality of second openings. The second bubbling apparatus at least partially encloses the plurality of first openings of the first bubbling apparatus. The gas is bubbled through the plurality of second openings into a liquid 503. In this manner, the In some embodiments, the plurality of first openings are situated such that the gas is evenly distributed to the plurality of second openings. In some embodiments, the plurality of first openings are situated such that the gas produces substantially similar sizes of bubbles from the second openings. In some embodiments, the second bubbling apparatus comprises a bubble plate or bubble tray. In some embodiments, the plurality of first openings are situated at a 90-180 degree offset from a surface that includes the plurality of second openings. In some embodiments, a line perpendicular to an outer surface of the first bubbling apparatus passing through any one of the plurality of first openings does not intersect any of the plurality of second openings.

In some embodiments, the first bubbling apparatus comprises a sparger, a nozzle, a bubble plate, a bubble cap, or a bubble tray. In some embodiments, the second bubbling apparatus is installed in a direct-contact exchanger. In some embodiments, the direct-contact exchanger comprises a bubble column, a bubble contactor, or a distillation column.

In some embodiments, the gas comprises combustion flue gas, syngas, producer gas, natural gas, steam reforming gas, light gases, refinery off-gases, acid gases, hydrogen cyanide, water, hydrocarbons, or combinations thereof. In some embodiments, the acid gases comprise carbon dioxide, nitrogen oxide, sulfur dioxide, nitrogen dioxide, sulfur trioxide, hydrogen sulfide, or a combination thereof.

In some embodiments, the contact liquid comprises water, hydrocarbons, liquid ammonia, liquid carbon dioxide, cryogenic liquids, or combinations thereof. In some embodiments, the hydrocarbons comprise 1,1,3-trimethylcyclopentane, 1,4-pentadiene, 1,5-hexadiene, 1-butene, 1-methyl-1-ethylcyclopentane, 1-pentene, 2,3,3,3-tetrafluoropropene, 2,3-dimethyl-1-butene, 2-chloro-1,1,1,2-tetrafluoroethane, 2-methylpentane, 3-methyl-1,4-pentadiene, 3-methyl-1-butene, 3-methyl-1-pentene, 3-methylpentane, 4-methyl-1-hexene, 4-methyl-1-pentene, 4-methylcyclopentene, 4-methyl-trans-2-pentene, bromochlorodifluoromethane, bromodifluoromethane, bromotrifluoroethylene, chlorotrifluoroethylene, cis 2-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, or combinations thereof.

In some embodiments, the first bubbling apparatus and the second bubbling apparatus comprise metals, ceramics, polymers, resins, or combinations thereof.

In some embodiments, the liquid is at a temperature substantially similar to a sublimation point of a component of the gas such that the component desublimates into the liquid as a solid.

In some embodiments, a surface of the first bubbling apparatus and a surface of the second bubbling apparatus comprise an adsorption inhibition material that inhibits adsorption of the component of the gas and deposition of the solid. In some embodiments, the adsorption inhibition material comprises polytetrafluoroethylene, polychlorotrifluoroethylene, smooth ceramics, natural diamond, man-made diamond, chemical-vapor deposition diamond, polycrystalline diamond, or a combination thereof. In some embodiments, the solid forms a blockage in one or more of the plurality of second openings, an instrument detects the blockage and transmits a signal regarding the blockage, and a processor receives the signal and controls a heating device to heat a surface of the plurality of second openings to a melting or a sublimating temperature of the solids, wherein the heating causes a portion of the blockage to melt, whereby the blockage is cleared. In some embodiments, the heating device heats the surface by applying an electric current to the filter media, resulting in resistive heating or by applying an induced current to the filter media, resulting in resistive heating.

The invention claimed is:
1. A device for bubbling a gas into a liquid comprising:
a first bubbling apparatus comprising a gas inlet for receiving the gas and a plurality of first openings for releasing the gas;
a second bubbling apparatus that houses the first bubbling apparatus, wherein the second bubbling apparatus receives the gas from the plurality of first openings, the second bubbling apparatus comprising a plurality of second openings for bubbling the gas into the liquid such that the liquid is prevented from passing through the second openings, wherein the first bubbling apparatus and the second bubbling apparatus are fully submerged in the liquid;
wherein the plurality of first openings are situated such that the gas is evenly distributed to the plurality of second openings;
wherein the plurality of first openings are situated such that the gas produces substantially similar sizes of bubbles from the second openings;
wherein the second bubbling apparatus comprises a bubble plate or bubble tray; and
wherein the plurality of first openings are situated at a 90-180 degree offset from a surface that includes the plurality of second openings.
2. The device of claim 1, wherein a line perpendicular to an outer surface of the first bubbling apparatus passing through any one of the plurality of first openings does not intersect any of the plurality of second openings.
3. The device of claim 1, wherein the first bubbling apparatus and the second bubbling apparatus comprise spargers, nozzles, bubble plates, bubble caps, or bubble trays.
4. The device of claim 1, wherein the second bubbling apparatus is installed in a direct-contact exchanger wherein the direct-contact exchanger comprises a bubble column, a bubble contactor, or a distillation column.
5. The device of claim 1, wherein the gas comprises combustion flue gas, syngas, producer gas, natural gas, steam reforming gas, light gases, refinery off-gases, acid gases, hydrogen cyanide, water, hydrocarbons, or combinations thereof.
6. The device of claim 1, wherein the gas comprises acid gases which comprise carbon dioxide, nitrogen oxide, sulfur dioxide, nitrogen dioxide, sulfur trioxide, hydrogen sulfide, or a combination thereof.
7. The device of claim 1, wherein the contact liquid comprises water, hydrocarbons, liquid ammonia, liquid carbon dioxide, cryogenic liquids, or combinations thereof.

8. A method for bubbling a gas into a liquid comprising:
passing a gas into a first bubbling apparatus of a device for bubbling a gas into a liquid according to claim 1;
passing the gas through the plurality of first openings into the second bubbling apparatus; and
bubbling the gas through the plurality of second openings into a liquid.

9. The method of claim 8, wherein the plurality of first openings are situated such that the gas is evenly distributed to the plurality of second openings.

10. The method of claim 9, wherein the plurality of first openings are situated such that the gas produces substantially similar sizes of bubbles from the second openings.

11. The method of claim 8, wherein the second bubbling apparatus is installed in a direct-contact exchanger, wherein the direct-contact exchanger comprises a bubble column, a bubble contactor, or a distillation column.

12. The method of claim 8, wherein the gas comprises combustion flue gas, syngas, producer gas, natural gas, steam reforming gas, light gases, refinery off-gases, acid gases, hydrogen cyanide, water, hydrocarbons, or combinations thereof.

* * * * *